UNITED STATES PATENT OFFICE.

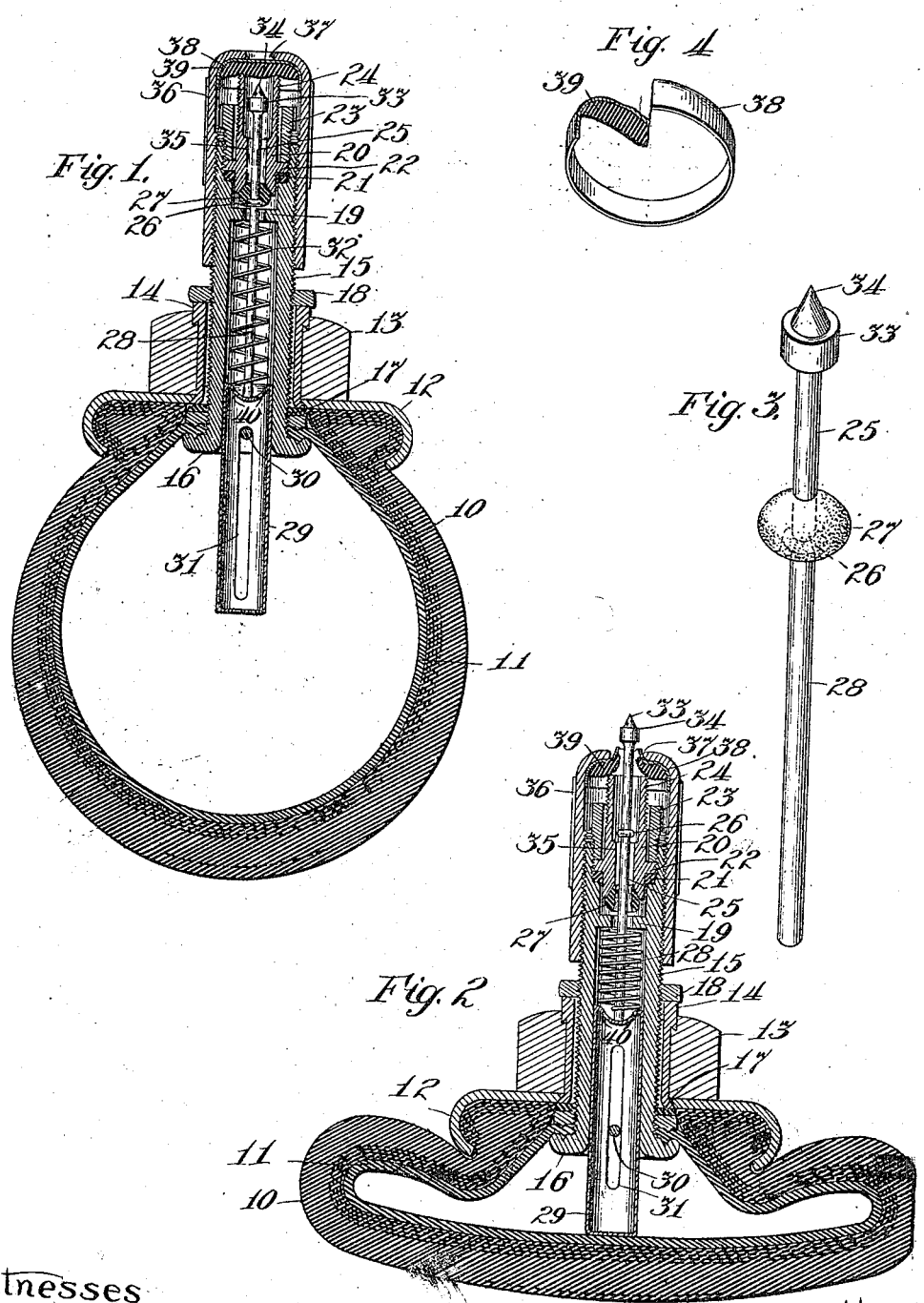

BAYARD E. TAYLOR, OF OAK PARK, ILLINOIS.

VALVE FOR PNEUMATIC TIRES.

1,177,063.  Specification of Letters Patent.  Patented Mar. 28, 1916.

Application filed March 11, 1912, Serial No. 682,851. Renewed June 26, 1915. Serial No. 36,552.

*To all whom it may concern:*

Be it known that I, BAYARD E. TAYLOR, a citizen of the United States, and resident of Oak Park, county of Cook, and State of Illinois, have invented certain new and useful Improvements in Valves for Pneumatic Tires, of which the following is a specification and which are illustrated in the accompanying drawings, forming a part thereof.

The invention relates to inlet valves for pneumatic tires such as are used on automobiles and bicycles; its object being to provide a warning signal to call attention to leaks in the tire which are of sufficient importance to cause its deflation.

The invention consists in its broader aspects in means for giving a signal of the collapse of a tire and actuated by the tire in its collapse.

More specifically, it consists in an induction valve for the tire so constructed that as the tire collapses the valve is ruptured to permit the escape of air in such volume as to produce a whistling sound sufficient to attract the attention of the occupant of the vehicle.

It is well known that pneumatic tires are in danger of serious structural injury when used in a deflated condition. This trouble is so serious that good practice demands the immediate removal or repair of a tire which will not hold the air, and yet it frequently happens that the vehicle will be driven for a considerable distance after deflation before its condition is discovered.

The present invention provides for a signal which will advise the vehicle occupant that the tire is becoming flattened before the air has escaped to such an extent as to produce injury to the fabric.

The invention is illustrated in the accompanying drawings, in which—

Figure 1 is a sectional view, transversely through the tire, the rim of the wheel, and longitudinally through the valve casing; Fig. 2 is a similar view showing the parts in the position assumed upon deflation; Fig. 3 is a detail of the valve; and Fig. 4 is a detail, partly broken away, of a puncturable disk mounted in the outer end of the cap of the valve casing.

The valve may be used in connection with any form of pneumatic tire, there being shown in the drawings a tire casing 10 of the ordinary clencher variety, and at 11 the inner tube used in connection with such a casing. The wheel rim is shown at 12, having the usual felly 13 (generally of wood) with an aperture within which is fitted a bushing 14 for receiving the valve casing.

The valve casing 15 is of the usual tubular form, being flanged at its inner end, as shown at 16, for engagement with the tube 11, a clamping nut 17 in threaded engagement with the casing 15 coöperating with the flange 16 to secure the casing to the tube. There is also present the usual binding nut 18, running upon the valve casing for clamping the latter to the rim of the wheel. The casing 15 is provided with a centrally apertured bridge 19 located a short distance from its outer end.

A valve seat 20, annular in form, enters the outer end of the casing 15, which is counterbored and threaded to receive it, an annular gasket 21 being interposed between a shoulder 22 on the seat 20 and the bottom of the counterbore. The valve seat is secured within the casing by means of an annular nut 23 entering the counterbore and bearing upon the outer face of the shoulder 22. The valve seat is provided with an outwardly extending nipple 24, adapted to be engaged by the nipple of an air pump.

The valve proper comprises a spindle 25, preferably having upon its shaft an enlargement 26 which serves as an anchorage and backing for a valve 27, which will ordinarily consist of a piece of rubber sleeved upon the valve shaft and secured to the enlargement or boss 26 by any suitable means, such as the vulcanizing process. The valve engages the inner end of the seat 20 and serves as a check to prevent the outward flow of air, sufficient space being provided between the valve seat and the bridge 19 to permit the valve to be unseated by air delivered under pressure from the pump, the bridge, however, preventing the inward movement of the valve.

As thus far described the device presents no novel features, the valve and its seat being substantially in accordance with common practice. The shaft of the valve is, however, extended inwardly, as shown at 28, for engagement by a plunger 29 slidingly mounted within the inner end of the casing 15 and normally extending into the tube 11, this plunger being held within the casing 15 by any suitable means, such as a pin 30, set across the inner end of the casing and passing through a longitudinal slot 31 in the plunger. The plunger is held in its extended position by means of a helical spring 32 reacting between its inner end and the bridge 19.

The valve spindle 25 is provided with an enlarged head 33 at its outer end, which preferably terminates in a piercing point 34. This head is housed within a counterbore in the valve seat 20. The enlargement or boss 26 is of less diameter than the duct 35, and when freed from the valve 27 may pass therethrough.

The cap 36 threaded upon the casing 15 has a frangible head. As shown this is secured by forming the cap with a central aperture, and seating within it, so as to close the aperture, a thin metal disk 38, preferably concave, to the inner face of which there is applied a gasket 39, preferably of rubber, which fits upon the outer end of the valve seat 20.

The valve is used in the ordinary way. For inflating the tire the cap 36 is removed. The pump nipple is fitted to the nipple 24 of the valve seat 20. The pump being operated the valve is unseated to admit the air which passes through the aperture in the bridge 19 and through the plunger 29, the inner end of which is suitably apertured for this purpose, as shown at 40.

The tire having been inflated, the pump is detached, the valve 27 being held to its seat by internal pressure; the cap 36 is fitted upon the casing and the tire is in condition for use.

While the valve is capable of withstanding the air pressure it will be destroyed when called upon to sustain the weight of the vehicle. Should the tire become flattened by partial deflation, its outer wall will force the plunger 29 outwardly, and with it the valve shaft 25, rupturing the valve 27, the gasket 39, and cap 36 (as shown in Fig. 2), permitting the rapid escape of the air, which will produce a whistling sound sufficiently loud to be certainly heard by the occupant of the vehicle, and thus advising him that the tire is defective. The valve and sealing cap having been destroyed, new ones are substituted.

While the invention is shown as applied to the induction valve of a tire, which construction is preferred for simplicity and cheapness, any device consisting of a vent openable by the collapse of the tire so as to produce a whistling sound by the escape of air may be used. Neither do I desire to be limited to the particular form of valve mechanism herein described when the openable vent is used in connection with the induction valve.

I claim as my invention—

1. In a valve for pneumatic tires, in combination, a casing, an outwardly seating valve within the casing, a plunger reciprocating within the casing and normally projecting beyond the inner end thereof, and destructively engaging the valve when forced outward.

2. In a valve for pneumatic tires, in combination, a casing, a centrally apertured valve seat within the casing, a destructible valve engaging the seat, a plunger reciprocating within the casing and adapted to bear outwardly upon the valve.

3. In a valve for pneumatic tires, in combination, a tubular casing, a centrally apertured valve-seat within the casing, a destructible valve bearing outwardly against the seat and having a spindle extending through the seat aperture, a puncturable cap at the outer end of the casing, and a plunger reciprocating within the inner end of the casing and engageable with the valve spindle.

4. In a valve for pneumatic tires, in combination, a tubular casing, a valve seat within the casing, a destructible valve bearing outwardly against the seat, a spindle carrying the valve and projecting outwardly and inwardly therefrom, a puncturable cap at the outer end of the casing, and a plunger reciprocating within the inner end of the casing and engageable with the inner end of the spindle.

5. In a valve for pneumatic tires, in combination, a casing, a puncturable external closure for the casing, and a plunger reciprocating within the inner end of the casing and destructibly engageable with the puncturable closure.

6. In a valve for pneumatic tires, in combination, a casing, a puncturable external closure for the casing, and a plunger actuated by the pressure of a collapsing tire to which the valve is applied for rupturing the closure.

BAYARD E. TAYLOR.

Witnesses:
Louis K. Gillson,
E. M. Klatcher.